(12) United States Patent
Van Hentenryck et al.

(10) Patent No.: US 8,527,444 B2
(45) Date of Patent: Sep. 3, 2013

(54) GAP REDUCTION TECHNIQUES FOR STOCHASTIC OPTIMIZATION USING ONE-STEP ANTICIPATORY ALGORITHM

(75) Inventors: Pascal Van Hentenryck, Barrington, RI (US); Gregoire Dooms, Geneva (CH)

(73) Assignee: Brown University, Providence, RI (US)

( * ) Notice: Subject to any disclaimer, the term of this patent is extended or adjusted under 35 U.S.C. 154(b) by 218 days.

(21) Appl. No.: 12/736,002

(22) PCT Filed: Mar. 5, 2009

(86) PCT No.: PCT/US2009/001450
§ 371 (c)(1),
(2), (4) Date: Jan. 7, 2011

(87) PCT Pub. No.: WO2009/111063
PCT Pub. Date: Sep. 11, 2009

(65) Prior Publication Data
US 2011/0099138 A1 Apr. 28, 2011

Related U.S. Application Data

(60) Provisional application No. 61/068,282, filed on Mar. 5, 2008.

(51) Int. Cl.
*G06N 5/02* (2006.01)
(52) U.S. Cl.
USPC .................................. 706/46; 703/2
(58) Field of Classification Search
USPC .............................. 706/46; 703/2
See application file for complete search history.

(56) References Cited

U.S. PATENT DOCUMENTS

| 6,735,596 | B2 | 5/2004 | Corynen | 1/1 |
| 2005/0203643 | A1 | 9/2005 | Jackson | 700/51 |
| 2006/0247990 | A1 | 11/2006 | Narayanan et al. | 705/35 |
| 2007/0005534 | A1 | 1/2007 | Sabato et al. | 706/19 |
| 2007/0282579 | A1 | 12/2007 | Dempster | 703/6 |

OTHER PUBLICATIONS

L. Mercier et al., "Performance Analysis of Online Anticipatory Algorithms for Large Multistage Stochastic Integer Programs", Brown University, 2007 ;Proceedings of the 20th Intl Joint Conf on Artificial intelligence, Jan. 6-12, 2007, pp. 1979-1984.
J. Choi et al., Dynamic Programming in a Heuristically Confined State Space: A Stochastic ResourceConstrained Project Scheduling Application, Computers & Chemical Engineering, 2004,1039-1058.

*Primary Examiner* — Kakali Chaki
*Assistant Examiner* — Mai T Tran
(74) *Attorney, Agent, or Firm* — Merchant & Gould PC

(57) ABSTRACT

In one exemplary embodiment of the invention, a method includes: receiving, by an input, input data descriptive of a stochastic scheduling optimization problem; generating, by a processor, at least one solution to the stochastic scheduling optimization problem using a one-step anticipatory algorithm, where the one-step anticipatory algorithm is configured to reduce an anticipatory gap of the stochastic scheduling optimization problem, where the anticipatory gap is a measure of stochasticity of the stochastic scheduling optimization problem, where the one-step anticipatory algorithm operates by determining a set of possible decisions for the stochastic scheduling optimization problem, generating a plurality of scenarios and solving the plurality of scenarios to obtain the at least one solution; and outputting, by an output, the generated at least one solution.

17 Claims, 11 Drawing Sheets

FIG. 2

ONLINEDECISIONMAKING $(A, \xi)$

1    $s \leftarrow (0, \emptyset, \emptyset)$;

2    while *true* do

3        $d \leftarrow A.decide(s)$;

4        if $d = \perp$ then

5            return $f(s, \xi)$;

6        $s \leftarrow applyDecision(d, s)$;

7        $s \leftarrow observe(s, \xi)$;

A.DECIDE$(s)$

1    $D \leftarrow Feasible(s)$

2    for $d \in D$ do

3        $score[d] \leftarrow 0$;

4    for $i \in 1..m$ do

5        $\xi \leftarrow sample(s)$;

6        for $d \in D$ do

7            $score[d] \leftarrow score[d] + O^+(s, d, \xi)$;

FIG. 3    8    $d \leftarrow \text{argmax}_{d \in D} score[d]$;

9    if $score[d] > 0$ then return $d$ else return $\perp$;

|  | AGR. | C2 | C5 | D.6 | D1.5 | REG. | P1 | P2 | P3 | P4 | R.6 | R1.5 | AVR. |
|---|---|---|---|---|---|---|---|---|---|---|---|---|---|
| CV | 14096 | 10806 | 4216 | 10062 | 13425 | 12418 | 17939 | 21242 | 28014 | 30051 | 7595 | 20394 | 15855 |
| HCDP | 12192 | 4218 | 0 | 6432 | 10333 | 7318 | 12638 | 16114 | 21657 | 24084 | 3571 | 13605 | 11013 |
| A | 12731 | 4342 | −6197 | 5712 | 10441 | 8115 | 14347 | 18602 | 26587 | 28851 | 3906 | 15096 | 11878 |

FIG.4

|  | AGR. | COST2 | COST5 | D.6 | D1.5 | REG. | P1 | P2 | P3 | P4 | R.6 | R1.5 | AVR. |
|---|---|---|---|---|---|---|---|---|---|---|---|---|---|
| $A_{TEPR}$ | 12612 | 5375 | 0 | 5737 | 10708 | 8432 | 14446 | 18474 | 26797 | 28918 | 4357 | 15586 | 12620 |
| AMSAA-ms | 12166 | 4335 | −3229 | 6143 | 10378 | 7856 | 14218 | 17879 | 23066 | 19058 | 3671 | 14502 | 10837 |
| AMSAA-s | 12754 | 4888 | 0 | 6893 | 10754 | 8452 | 14736 | 19007 | 26951 | 29099 | 4134 | 15525 | 12766 |

FIG.9

| | AGR. | C2 | C5 | D.6 | D1.5 | REG. | P1 | P2 | P3 | P4 | R.6 | R1.5 | AVR. |
|---|---|---|---|---|---|---|---|---|---|---|---|---|---|
| CV | 14096 | 10806 | 4216 | 10062 | 13425 | 12418 | 17939 | 21242 | 28014 | 30051 | 7595 | 20394 | 15855 |
| HCDP | 12192 | 4218 | 0 | 6432 | 10333 | 7318 | 12638 | 16114 | 21657 | 24084 | 3571 | 13605 | 11013 |
| A | 12731 | 4342 | -6197 | 5712 | 10441 | 8115 | 14347 | 18602 | 26587 | 28851 | 3906 | 15096 | 11878 |
| Aω | 12414 | 3544 | -3042 | 5760 | 9097 | 7606 | 13674 | 18542 | 26808 | 28967 | 3430 | 13855 | 11721 |
| AGC | 12696 | 4804 | 0 | 5588 | 10448 | 8146 | 14442 | 18760 | 26794 | 28956 | 3840 | 15000 | 12456 |
| ATS | 12681 | 4355 | -2066 | 7950 | 10059 | 8281 | 13861 | 17392 | 23330 | 26031 | 4451 | 14461 | 11732 |
| ATI | 12444 | 4261 | 0 | 6688 | 9702 | 8036 | 14518 | 18755 | 26787 | 28961 | 3903 | 14670 | 12394 |
| ATE | 12608 | 4495 | -1659 | 5467 | 10435 | 8337 | 14563 | 18728 | 26787 | 28919 | 3937 | 15385 | 12334 |
| ATEPR | 12612 | 5375 | 0 | 5737 | 10708 | 8432 | 14446 | 18474 | 26797 | 28918 | 4357 | 15586 | 12620 |

FIG.7

GAP REDUCTION TECHNIQUES FOR STOCHASTIC OPTIMIZATION USING ONE-STEP ANTICIPATORY ALGORITHM

CROSS REFERENCE TO RELATED APPLICATIONS

This application claims benefit to PCT/US2009/001450 filed Mar. 5, 2009, which claims benefit to U.S. Provisional Application Ser. No. 61/068,282 filed Mar. 5, 2008, the disclosures of which are hereby incorporated by reference in their entirety.

STATEMENT REGARDING FEDERALLY SPONSORED RESEARCH OR DEVELOPMENT

This invention was made with government support under grant #DMI-0600384, awarded by the National Science Foundation (NSF), and "ONR" #N000-14-06-1-0607, awarded by the Office of Naval Research (ONR). The government has certain rights in the invention.

TECHNICAL FIELD

The exemplary and non-limiting embodiments of this invention relate generally to stochastic algorithms, such as stochastic combinatorial optimization algorithms, and, more specifically, relate to gap (e.g., anticipatory gap) reduction techniques (e.g., to improve the effectiveness of one-step anticipatory algorithms for online stochastic optimization).

BACKGROUND

Anticipatory algorithms for online stochastic optimization have been shown to be very effective in a variety of areas, including logistics, reservation systems, and scheduling, as non-limiting examples. For such applications which typically feature purely exogenous uncertainty, the one-step anticipatory algorithm was shown theoretically to be close to optimal when the stochasticity of the problem, as measured by the anticipatory gap, was small.

Reference is herein made to the following publications:
[1] R. Bent and P. Van Hentenryck. Scenario-Based Planning for Partially Dynamic Vehicle Routing Problems with Stochastic Customers. *Operations Research*, 52(6), 2004.
[2] R. Bent and P. Van Hentenryck. "Waiting and Relocation Strategies in Online Stochastic Vehicle Routing." *IJCAI'07*, 2007.
[3] J. Choi, M. Realff, and J. Lee. "Dynamic Programming in a Heuristically Confined State Space: A Stochastic Resource-Constrained Project Scheduling Application." *Computers and Chemical Engineering*, 28(6-7):1039-1058, 2004.
[4] L. Mercier and P. Van Hentenryck. "Performance Analysis of Online Anticipatory Algorithms for Large Multistage Stochastic Programs." *IJCAI'07*, 2007.
[5] L. Mercier and P. Van Hentenryck. "AMSAA: A Multistep Anticipatory Algorithm for Multistage Stochastic Combinatorial Optimization." Submitted to *CPAIOR*, 2007.
[6] D. Parkes and A Duong. "An Ironing-Based Approach to Adaptive Online Mechanism Design in Single-Valued Domains." In *AAAI'07*, pages 94-101, 2007.
[7] M. Thomas and H. Szczerbicka. "Evaluating Online Scheduling Techniques in Uncertain Environments." In *the 3rd Multidisciplinary International Scheduling Conference*, 2007.
[8] P. Van Hentenryck and R. Bent. *Online Stochastic Combinatorial Optimization*. The MIT Press, Cambridge, Mass., 2006.

Online anticipatory algorithms [8] have been recently proposed to address a wide variety of online combinatorial optimization problems in areas such as logistics, networking, scheduling, and reservation systems. The applications emerged from progress in telecommunication and in information technologies which enable organizations to monitor their activities in real time and collect a significant amount of historical data. One-step anticipatory algorithms rely on two black-boxes: a conditional sampler to generate scenarios consistent with past observations and an offline solver which exploits the combinatorial structure of the application to solve the deterministic version of the problem. Their essence is to transform the multi-stage stochastic optimization application into a 2-stage problem by ignoring all non-anticipativity constraints but those of the current decision. This 2-stage problem is then approximated by sampling, and the approximated problem is solved optimally by computing the offline optimal solutions for all pairs (scenario, decision). One-step anticipatory algorithms were shown to be very effective on a variety of online stochastic combinatorial problems in dynamic fleet management [1, 2], reservation systems [8], resource allocation [6], and jobshop scheduling [7]. They were also analyzed theoretically in [4] in terms of the global anticipatory gap (GAG), which is a measure of the stochasticity of the application. The analysis shows that, when the GAG is small, anticipatory algorithms are guaranteed to return high-quality solutions when run with enough scenarios.

SUMMARY

In one exemplary embodiment of the invention, a method comprising: receiving, by an input, input data descriptive of a stochastic scheduling optimization problem; generating, by a processor, at least one solution to the stochastic scheduling optimization problem using a one-step anticipatory algorithm, where the one-step anticipatory algorithm is configured to reduce an anticipatory gap of the stochastic scheduling optimization problem, where the anticipatory gap is a measure of stochasticity of the stochastic scheduling optimization problem, where the one-step anticipatory algorithm operates by determining a set of possible decisions for the stochastic scheduling optimization problem, generating a plurality of scenarios and solving the plurality of scenarios to obtain the at least one solution; and outputting, by an output, the generated at least one solution.

In another exemplary embodiment of the invention, an apparatus comprising: a memory configured to store input data descriptive of a stochastic scheduling optimization problem; and a processor configured to receive the input data from the memory, to generate at least one solution to the stochastic scheduling optimization problem using a one-step anticipatory algorithm, and to output the generated at least one solution, where the one-step anticipatory algorithm is configured to reduce an anticipatory gap of the stochastic scheduling optimization problem, where the anticipatory gap is a measure of stochasticity of the stochastic scheduling optimization problem, where the one-step anticipatory algorithm operates by determining a set of possible decisions for the stochastic scheduling optimization problem, generating a plurality of scenarios and solving the plurality of scenarios to obtain the at least one solution.

In another exemplary embodiment of the invention, a program storage device readable by a machine, tangibly embodying a program of instructions executable by the machine for performing operations, said operations comprising: receiving input data descriptive of a stochastic scheduling optimization problem; generating at least one solution to the stochastic scheduling optimization problem using a one-step anticipatory algorithm, where the one-step anticipatory algorithm is configured to reduce an anticipatory gap of the stochastic scheduling optimization problem, where the anticipatory gap is a measure of stochasticity of the stochastic scheduling optimization problem, where the one-step anticipatory algorithm operates by determining a set of possible decisions for the stochastic scheduling optimization problem, generating a plurality of scenarios and solving the plurality of scenarios to obtain the at least one solution; and outputting the generated at least one solution.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 2 depicts a generic online decision-making algorithm;

FIG. 3 illustrates a basic one-step anticipatory algorithm;

FIG. 4 shows experimental results of the one-step anticipatory algorithm of FIG. 3;

FIG. 7 depicts exemplary experimental results on gap reduction techniques in accordance with exemplary embodiments of the invention;

FIG. 9 shows a comparison of an exemplary algorithm $A_{TEPR}$, in accordance with exemplary embodiments of the invention, with AMSAA;

DETAILED DESCRIPTION

1. Introduction

Figures 1, 1A:
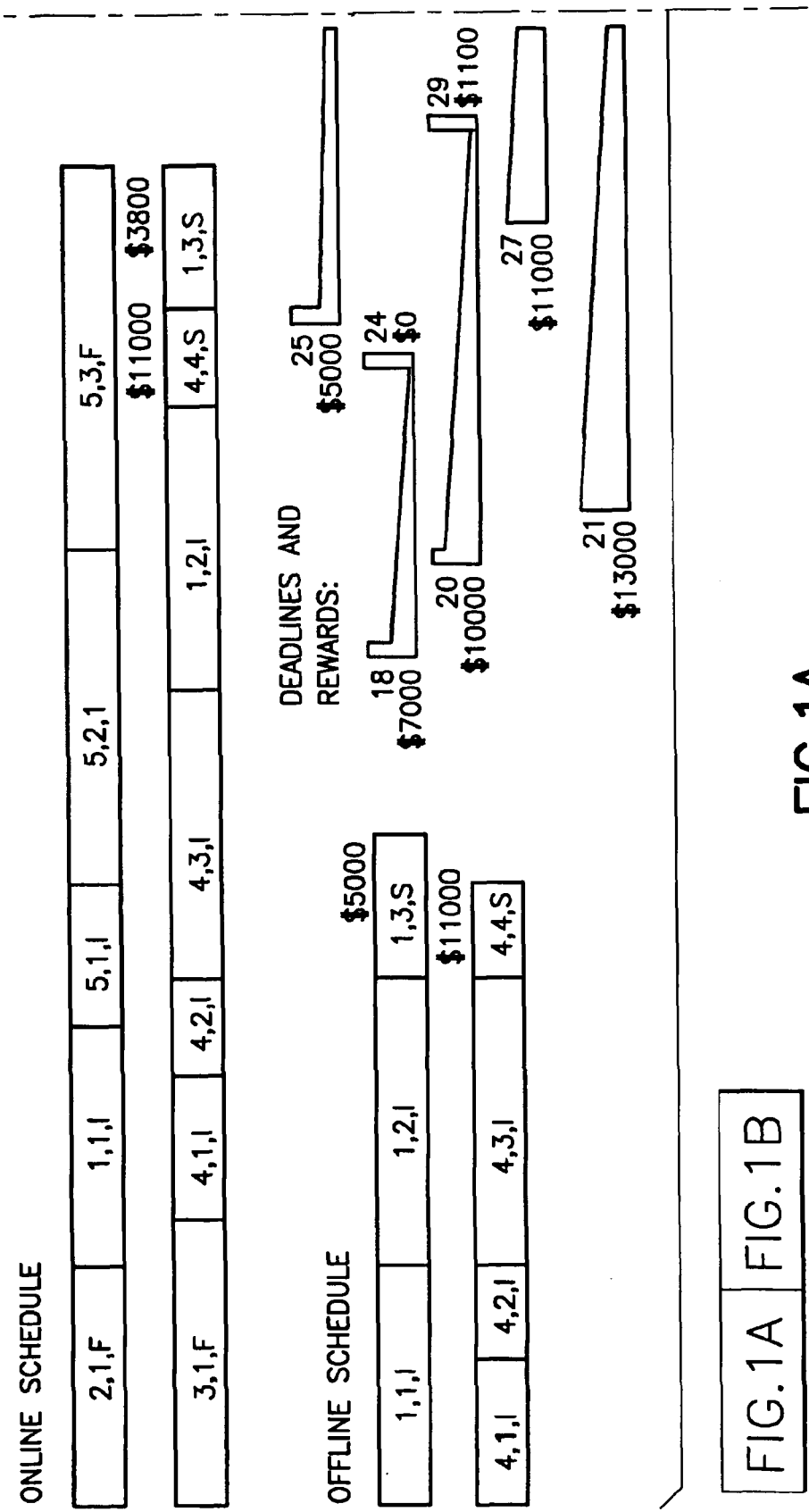
FIG. 1, which is comprised of FIGS. 1A and 1B arranged next to one another as indicated in the lower left-hand corner of FIG. 1A, shows an example of online and offline schedules for the S-RCPSP and a Markov Chain describing the uncertainty of a job.

This application, and at least some of the exemplary embodiments of the invention, studies the behavior of one-step anticipatory algorithms on applications in which the uncertainty is exogenous but the observations are endogenous. It is shown that one-step anticipatory algorithms exhibit a much larger anticipatory gap and, further, a number of gap-reduction techniques are proposed to address this limitation. The resulting one-step anticipatory algorithms are shown to outperform significantly the state-of-the-art dynamic-programming approach on an online stochastic resource-constrained project scheduling application.

It is shown that, despite these difficulties, one-step anticipatory algorithms still outperform the state-of-the-art algorithm proposed in [3] which applies dynamic programming to a heuristically-confined state space (HCDP). Moreover, a number of exemplary, generic gap-reduction techniques are considered, including a waiting strategy, gap correction, time scaling, and problem pruning. These exemplary techniques significantly improve the behavior of one-step anticipatory algorithms which provide an average improvement of about 15% compared to the HCDP algorithm.

This applications is organized as follows. Section 2 specifies the online SRCPSP. Section 3 generalizes the generic online algorithm proposed in [8] to accommodate endogenous observations. Section 4 shows how to instantiate the generic algorithm to the online S-RCPSP. Section 5 presents an improved version of the HCDP algorithm from [3]. Section 6 presents the one-step anticipatory algorithm and studies its behavior experimentally. Sections 7, 8, 9, and 10 describe exemplary gap-reduction techniques. Section 11 presents experimental results and Section 12 presents a conclusion. Section 13 describes further exemplary embodiments of the invention.

2. Online Stochastic Project Scheduling

This section describes the online Stochastic Resource-Constrained Project Scheduling Problem (S-RCPSP) from [3]. It starts with the offline (deterministic) problem, presents its stochastic and online versions, and illustrates the problem visually.

The Resource Constrained Project Scheduling The RCPSP consists of a set of projects (jobs) that must be scheduled on a number of laboratories (machines). Each project consists of a sequence of experiments (activities) which are characterized by their durations and their costs. Each project brings a reward which depends on its completion time. The goal is to schedule the jobs to maximize revenues, i.e., the sum of the project rewards minus the sum of the activity costs. More formally, given a set of labs L, and a set of jobs J, a RCPSP instance $\xi$ consists of a sequence of $n(j, \xi)$ activities $a_{1,j,\xi}, \ldots, a_{n(j,\xi),j,\xi}$ for each job $j \in J$. Activity $a_{i,j,\xi}$ has duration $d_{i,j,\xi}$ and cost $c_{i,j,\xi}$. The reward of project j is given by a function $f_j: \mathbb{N} \to \mathbb{R}$ which, given a completion time t of project j, returns its reward $f_j(t)$. A solution to a RCPSP instance $\xi$ is a schedule $\sigma$, i.e., is a partial assignment of activities to labs and starting times $\sigma: A \to L \times \mathbb{N}$. The schedule typically assigns only a subset of activities but satisfies the constraint that, if an activity is assigned to a lab at a given start time, all the preceding activities of the job must have been assigned to a lab and completed before the start time. The set of activities scheduled in $\sigma$ is denoted by $dom(\sigma)$ (utilizing $a_{i,j,\xi} \in \sigma$ instead of $a_{i,j,\xi} \in dom(\sigma)$ for short). If $a \in \sigma$, let $\sigma_s(a)$ denote the start time of activity a in σ and σ₁(a) its lab assignment. A project j is scheduled in σ, denoted by j∈σ, if all its activities are scheduled in σ and its completion time ct(j,σ) is given by $\sigma_s(a_{n(j,\xi),j,\xi})+d_{n(j,\xi),j,\xi}$. The objective value of a schedule is given by:

$$f(\sigma, \xi) = \sum_{j \in \sigma} f_j(ct(j, \sigma)) - \sum_{a_{i,j,\xi} \in \sigma} c_{i,j,\xi}.$$

The S-RCPSP The S-RCPSP has uncertainty regarding the durations, the costs, and the outcomes of activities. In particular, an activity can now fail, in which case the entire project fails. It may also succeed, in which case the project is successful and completed. If the activity neither fails or succeeds, its status is "open". Activities whose outcome is a success or a failure have no successors. Formally, a S-RCPSP is specified by a probability distribution over the set Ξ of RCPSP scenarios. Each scenario ξ∈Ξ specifies a RCPSP instance. Moreover, for each activity $a_{i,j,\xi}$, the scenario specifies an outcome $a_{i,j,\xi}$∈{success, fail, open}. A job j is a success in ξ, denoted by success(j,ξ), if its sequence of activities is of the form $o_{1,j,\xi}= \ldots =o_{n(j,\xi)-1,j,\xi}$=open & $o_{n(j,\xi),j,\xi}$=success.

It is a failure otherwise, which means that its sequence is of the form $o_{1,j,\xi}= \ldots =o_{n(j,\xi)-1,j,\xi}$=open & $o_{n(j,\xi),j,\xi}$=failure.

The goal in the S-RCPSP is to find a schedule σ maximizing the objective $$E_\xi \left[ \sum_{j \in \sigma: success(j,\xi)} f_j(ct(j, \sigma)) - \sum_{a_{i,j,\xi} \in \sigma} c_{i,j,\xi} \right]$$

In [3], the distribution of S-RCPSP scenarios is specified as follows. The number of jobs, labs, and the reward functions of all jobs are the same for all scenarios. The uncertainty on the sequence of activities of each job is modeled using a Markov chain. Each activity $a_{i,j}$ has a set R of potential realizations which are tuples of the form ⟨$o_{i,j,r}, c_{i,j,r}, d_{i,j,r}$⟩ specifying the outcome $o_{i,j,r}$, $c_{i,j,r}$, cost and duration $d_{i,j,r}$ of the activity. The probability to reach a given realization for an activity is conditioned on the realization of its preceding activity. More formally, a transition matrix $P_{i,j}$ defines the conditional probability $p_{i,j,r,r'}$ of activity $a_{i,j}$ having realization r given that activity $a_{i-1,j}$ has realization r', i.e., $$p_{i,j,r,r'} = Pr(\langle c_{i,j,\xi}, d_{i,j,\xi}, o_{i,j,\xi} \rangle$$
$$= \langle c_{i,j,r}, d_{i,j,r}, o_{i,j,r} \rangle | \langle c_{i-1,j,\xi}, d_{i-1,j,\xi}, o_{i-1,j,\xi} \rangle$$
$$= \langle c_{i-1,j,r'}, d_{i-1,j,r'}, o_{i-1,j,r'} \rangle )$$

Figure 1B:
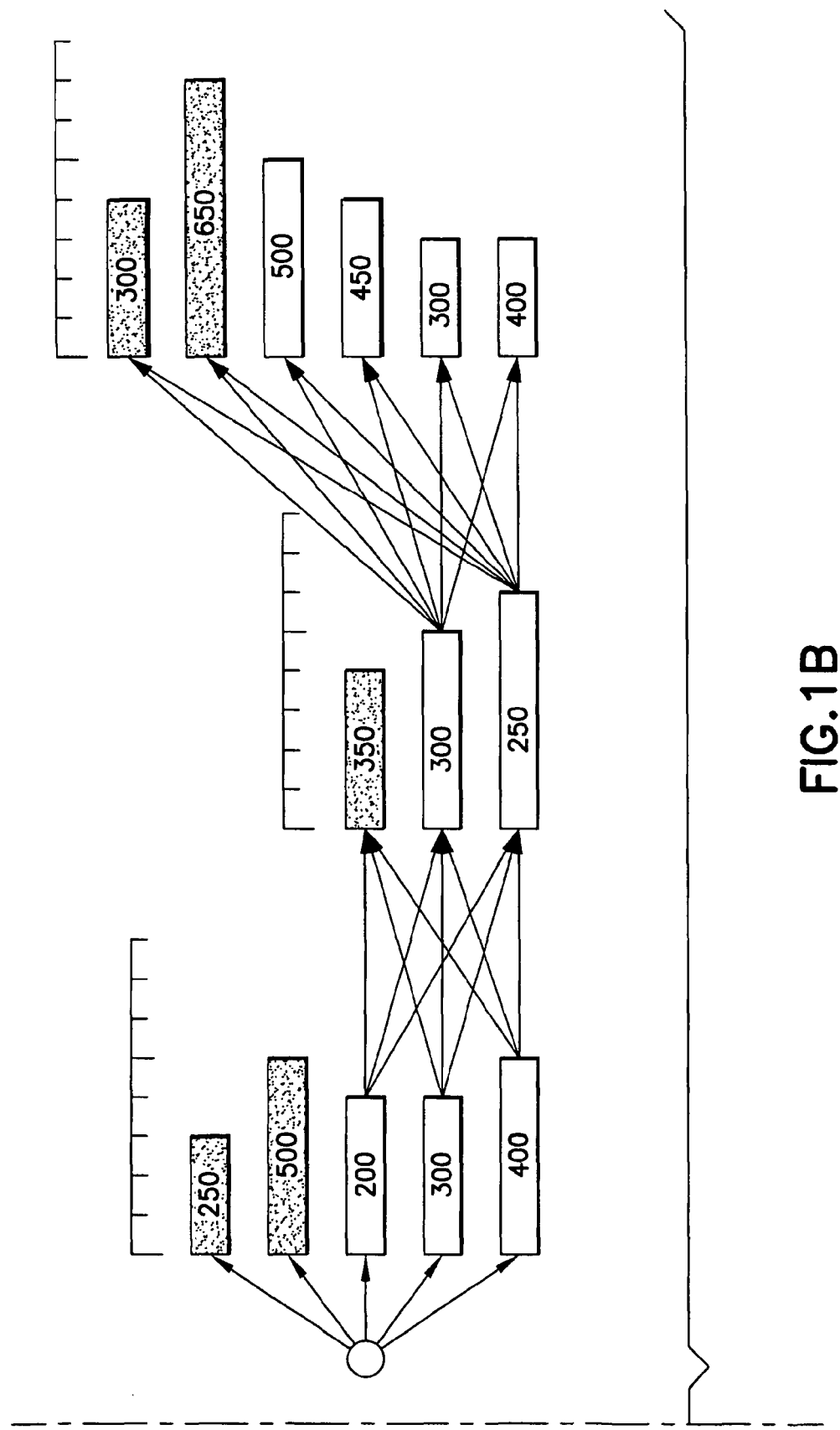

FIG. 1, which is comprised of FIGS. 1A and 1B arranged next to one another as indicated in the lower left-hand corner of FIG. 1A, illustrates such a Markov chain. In FIG. 1, the failing activities include: 1,1,I (online); 4,1,I (online); 4,2,I (online); 4,3,I (online); 1,2,I (online); 4,4,S (online); 1,3,S (online); 1,1,I (offline); 1,2,I (offline); 1,3,S (offline); 4,1,I (offline); 4,2,I (offline); 4,3,I (offline) and 4,4,S (offline). The costs are given inside the activities, and the durations are specified by the length of the tasks. The probability distributions are shown implicitly by the thickness of the transition arrows. For instance, the first activity has a low probability of having a realization with a cost of 400. However, if such a realization happens, it then has a high probability of having a second realization with a cost 250 and a rather long duration.

The Online S-RCPSP In the online S-RCPSP, the decision maker alternates between scheduling activities and observing the uncertainty. Although the uncertainty about the projects and their activities is exogenous, the decision maker must schedule an activity to observe its realization, that is its duration, its cost, and its outcome. In particular, its outcome is revealed only when the activity is completed, at which time the decision maker also knows its duration and its cost. The online S-RCPSP is thus of a fundamentally different nature than the online stochastic optimization applications presented in [8]. Indeed, in these applications, the uncertainty is purely exogenous and is about which requests arrive and when: once a request is placed, its information is fully revealed. In the online S-RCPSP, the decision maker must schedule an activity to reveal its uncertainty, which means that the observation is conditioned to a prior decision (thus it is endogenous). This poses some serious computational issues, partly due to the fact that activities may fail, in which case their project will incur a cost, take scheduling time, and bring no reward.

Illustration FIG. 1 (that is, FIGS. 1A and 1B taken together) illustrates the concepts visually. It depicts the reward functions of five jobs (bottom right of the left). The reward $f_j$ of each job is a constant before its first deadline $d_j$; it then decreases linearly until a second deadline after which it remains constant. For instance, the third job has a reward of 10,000 if it is completed before time 20 and the reward decreases linearly between 20 and 29 to reach 1,100 at the second deadline.

The bottom-left of the figure describes the clairvoyant schedule which has observed the uncertainty. The solution schedules the first and the fourth job, which finish at times 14 and 13 and yield rewards of 5,000 and 11,000, respectively. The inside of each activity specifies the job number, the activity number, and the outcome. The top portion describes an online schedule. The online schedule includes activities of failing jobs 2, 3, and 5, with job 5 failing very late. These failed projects push the finish time of job 1 which only brings a reward of 3,800. Of course, the value of the entire schedule further decreases by the cost of scheduling the activities of the failed projects.

3. The Generic Online Decision-Making Algorithm

Because of the endogenous nature of observations, the online generic algorithm presented in [8] must be generalized to accommodate the concept of observation explicitly. A new exemplary, generic algorithm is depicted in FIG. 2. It receives a decision-making agent A and a scenario ξ unknown to the decision maker and it maintains the current state of decisions and observation s. As long as the decision maker does not decide to terminate (decision ⊥ in line 4), the online algorithm calls the agent to obtain a decision d (line 3). The decision is applied to the state in line 6 and possible realizations of the uncertainty are observed in line 7. When the decision-maker terminates, the algorithm returns the value of the final state (line 5).

4. Instantiating the Outline Decision-Making Algorithm

Below is described how to instantiate the states, the decisions, and the functions applyDecision and observe for the online S-RCPSP. Many of the subsequent sections are concerned with how to make the decision in line 3.

States of the Online Decision-Making Algorithm The states for the online S-RCPSP are triples $\langle t, C, R \rangle$, in which t represents the time, C the scheduling decisions whose activities have been completed and R the scheduling decisions whose activities are still running on the labs. The set C contains tuples of the form $\langle i,j,c_{i,j,\xi},d_{i,j,\xi},o_{i,j,\xi},t_{i,j,\xi},l_{i,j,\xi} \rangle$, specifying that completed activity $a_{i,j,\xi}$ has cost $c_{i,j,\xi}$, duration $d_{i,j,\xi}$, outcome $o_{i,j,\xi}$, and has been scheduled at time $t_{i,j,\xi}$ in lab $l_{i,j,\xi}$. The set R contains tuples of the form $\langle i,j,t_{i,j,\xi},l_{i,j,\xi} \rangle$, specifying that running activity $a_{i,j,\xi}$ has been scheduled at time $t_{i,j,\xi}$ in lab $l_{i,j,\xi}$. For simplicity, use $a_{i,j,\xi} \in C$ to denote $\exists c,d,o,t,l: \langle i,j,c,d,o,t,l \rangle \in C$ and use a similar notation for membership in R. Finally, use $f(s,\xi)$ to denote the objective value of a state s for scenario $\xi$.

Decisions In a first approximation, there are only two types of decisions: scheduling a job in a lab and terminating. Scheduling a job j is feasible in state s, denoted by Feasible (j,s), if none of its activities are currently running and if all its completed activities have open outcomes, i.e., $\neg \exists i: a_{i,j,\xi} \in R \wedge \forall a_{i,j,\xi} \in C: o_{i,j,\xi} = $open. The set of feasible scheduling decisions in state s consists of scheduling feasible jobs in some available lab, i.e., Feasible(s)={schedule(j,l)|j ∈ J˜Feasible(j,s)^ ¬∃i,j,t:
$\langle i,j,t,l \rangle \in R$}.

Terminating is the equivalent of rejecting all requests in request-based online applications and consists in renouncing to schedule all the remaining activities.

Applying a Decision One may now specify the function applyDecision which describes the effect of applying a decision in a state:

applyDecision(schedule(j,l),$\langle t,C,R \rangle$)=$\langle t,C,R \cup \langle$next$(j,C),j,t,l \rangle \rangle$ where next(j,C) denotes the next activity of job j to schedule. Scheduling a job on a lab simply inserts the next activity of the job on the lab.

Observations It remains to specify the observe function which returns the next decision state. This happens whenever one of the running activities is completed. For a state s and a scenario $\xi$, this is given by $NT(s,\xi) = \min_{a_{i,j,\xi} \in R} t_{i,j,\xi} + d_{i,j,\xi}$. The completed activities, i.e., Completed(s,$\xi$)={$\langle i,j,t,l \rangle \in R | t+d_{i,j,\xi} \leq NT(s,\xi)$}, must then be removed from the running set and transferred, with their observations, to the set of completed decisions, i.e., Backup(s,$\xi$)={$\langle i,j,c_{i,j,\xi},d_{i,j,\xi},o_{i,j,\xi},t,l \rangle | \langle i,j,t,l \rangle \in$Completed(s,$\xi$)}.

With this available, the observe function can be specified as observe($\langle t,C,R \rangle$,$\xi$)=$\langle NT(s,\xi),C \cup$Backup(s,$\xi$),$R \setminus$Completed(s,$\xi$)$\rangle$.

One may use $\tau(s,d,\xi)$=observe(applyDecision(d,s),$\xi$) to denote the transition obtained by taking decision d in state s and observing $\xi$ in the resulting state.

5. Heuristically-Confined Dynamic Programming

The online S-RCPSP originated from [3] who also proposed a solution technique to approach it: dynamic programming in a heuristically-confined state space (HCDP). Their approach is motivated by the fact that, on their instances, there are 109 possible scenarios. Combined with the inherent combinatorics of the offline problem itself, this would generate a gigantic state space, which would preclude the use of dynamic programming techniques.

To tackle this complexity issue, they propose a three-stage algorithm. In the first step, their algorithm applies a set H of heuristics on a set $\Xi$ of scenarios to explore a number of reasonable trajectories in the state space. In the second step, these states are then merged to form a directed acyclic graph that defines a heuristically-confined state space. In the third step, the algorithm uses dynamic programming to obtain the best decision in this state space. The algorithm can be specified as an instantiation of the generic online algorithm as follows. Let $D(s,H,\Xi)$ be the set of decisions taken by the heuristics in H in state s for the set $\Xi$ of scenarios during the first phase of the algorithm and let $C(s,\Xi)$ be the set of scenarios in $\Xi$ compatible with state s, that is the set of scenarios $\xi$ such that there exists a trajectory $$s_0 \xrightarrow{d_0} s_1 \xrightarrow{d_1} \ldots \xrightarrow{d_{t-1}} s_t = s$$

satisfying $s_{i+1} = \tau(s_i,d,\xi)$ for all i<t. The HCDP policy value of decision d in state s for a set of scenarios $\Xi$ and the set H of heuristics is given by $$v(s, d, \Xi, H) = \frac{1}{\#C(s, \Xi)} \sum_{\xi \in C(s,\Xi)} Q(\tau(s, d, \xi), C(s, \Xi), H)$$

where the Q-value is defined as follows $$Q(s, \Xi, H) = \begin{cases} \frac{1}{\#C(s, \Xi)} \sum_{\xi \in C(s,\Xi)} f(s, \xi) & \text{if } s \text{ is a leaf;} \\ \max_{d \in D(s,H,\Xi)} v(s, d, \Xi, H) & \text{otherwise.} \end{cases}$$

We specify the HCDP algorithm as an instance of the online generic algorithm:

HDCP.DECIDE(s)
1 $\Xi \leftarrow$ {sample(s)|i ∈ 1 ... 10,000};
2 return $\text{argmax}_{d \in D(s,H,\Xi)} v(s,d,\Xi,H)$;

where sample is a conditional sampling procedure to generate scenarios of the future compatible with the observation in state s. This implementation is in fact an improvement over [3] because the heuristics and the dynamic program are run for every decision, instead of once at the beginning of the computation. The results improve significantly with this online implementation. Moreover, the actual implementation also uses the fact that the graph is acyclic to improve the runtime performance.

6. The One-Step Anticipatory Algorithm

Consider now the use of one-step anticipatory algorithm for the online S-RCPSP. Anticipatory algorithms for online stochastic combinatorial optimization [8] make decisions by generating scenarios of the future, solving these scenarios optimally, and exploiting the resulting optimal solutions to select a decision. They typically use two black-boxes: (1) An optimization algorithm $O(s,\xi)$ to solve the offline problem associated with state s and scenario $\xi$ and (2) A conditional sampling procedure sample(s) to generate scenarios of the future compatible with the observation in state s. In the S-RCPSP, the offline problem associated with a state s and scenario $\xi$ is the scenario $\xi$ with the additional constraints that all scheduling decisions in state s must be enforced. Note that the uncertainty is completely revealed in this offline problem:

the costs and durations of the activities, as well as their outcomes, are known to O. As a result, failed projects and their activities are never scheduled in their optimal solutions.

This discussion focuses on the one-step anticipatory algorithm which solves a number of scenarios and selects the best decision with respect to these scenarios. This algorithm was initially proposed for exogenous uncertainty but generalizes naturally to those applications with endogenous observations. Its pseudo-code is depicted in FIG. 3. Let $O^*(s,d,\xi)=O(s,d,\xi)-f(s,\xi)$, where $O(s,d,\xi)=O(\text{applyDecision}(d,s),\xi)$, denote the "future" value of the scenario when decision d is taken. The algorithm first collects the set of possible decisions (line 1) and initializes their scores (lines 2-3). It then generates m scenarios (lines 4-5), which are solved optimally (line 7) for each decision d, whose score is updated accordingly. The decision d with the best score is computed in line 8. The algorithm terminates (decision ⊥) if the score of the best decision is not positive and returns the best decision otherwise.

This one-step anticipatory algorithm was analyzed for purely exogenous problems in [4]. It was shown that the expected loss of the anticipatory algorithm compared to the clairvoyant (i.e., the expected value of the offline problems) is bounded by the global anticipatory gap, which measures the stochasticity of the problem (instance+distribution) and a sampling error which can be arbitrarily small. Moreover, many applications in online routing, scheduling, and resource allocation were shown to have a small global anticipatory gap, explaining the excellent behavior of (approximations) of the one-step anticipatory algorithms. The anticipatory gap of a decision d in a state s is defined as:

$$\Delta_g(s) = E_\xi\left[\max_{d \in D} O(s, d, \xi)\right] - \max_{d \in D} E_\xi[O(s, d, \xi)],$$

and measures the difference in expectation between being clairvoyant now and after the decision in state s. The global anticipatory gap for an algorithm is simply the sum of the local anticipatory gap for each successive state.

FIG. 4 depicts the results of the one-step anticipatory algorithms on a variety of instances derived from the benchmark in [3]. The figure gives the expected value $E_\xi[O(s_0,\xi)]$ of the clairvoyant (CV) where all the uncertainty is revealed immediately, the expected value of HCDP, and the expected value of the one-step anticipatory algorithm (A) with 200 scenarios. The results contain both good and bad news. On the one hand, the one-step anticipatory algorithm performs better in general and in average than the HCDP algorithm, showing the benefit of solving scenarios optimally. This is a very satisfying result since it means that one-step anticipatory algorithms apply to applications with endogenous observations and outperform the best method proposed for the online S-RCPSP. On the other hand, the loss of the anticipatory algorithm compared to the clairvoyant is quite substantial and may reach about 10,000 and 6,000 on instances C5 and C2. These instances are considered in further detail in subsequent sections.

Figure 5A:
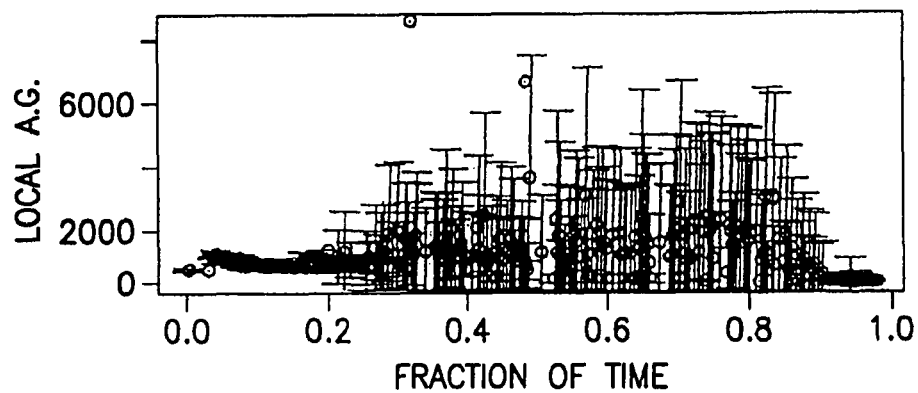
FIG. 5A illustrates an exemplary local anticipatory gap.
Figure 5B:
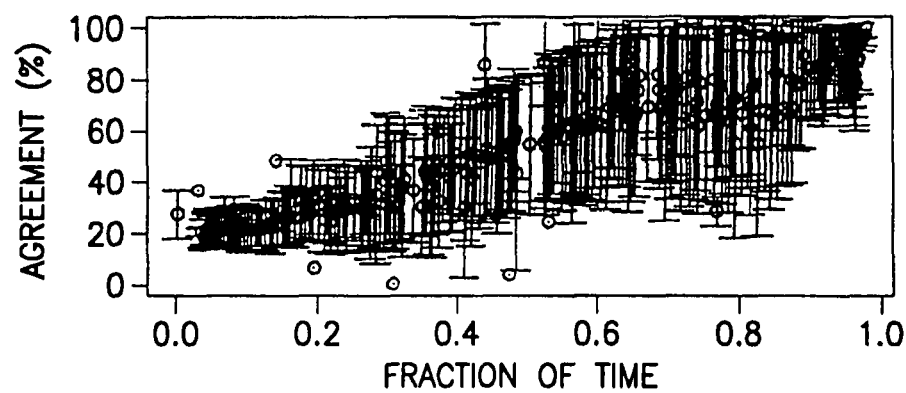
FIG. 5B illustrates exemplary agreement degree as a function of decision time.

The distance between the anticipatory algorithm and the clairvoyant can be explained by the theoretical analysis in [4]. Indeed, FIGS. 5A and 5B depict the evolution of the local anticipatory gap and the agreement degree over time. The circles in the figure give the mean, while the intervals show one standard deviation around each side of the mean. FIG. 5A shows a significant local anticipatory gap, particularly during the middle part of the execution. In the early part of the execution, the gap is small, because the algorithm has time to recover from a bad decision. FIG. 5B depicts the agreement degree, i.e., the percentage of scenarios which admit the same optimal decision. Although this agreement is well above 70% in average in applications in routing, packet scheduling, and reservation systems, it is only 20% early in the execution and below 40% for a substantial part of the execution in the online S-RCPSP.

Why is the gap so large and the agreement so low in the online S-RCPSP? One of the main reasons is the endogenous nature of the observations. Indeed, the clairvoyant immediately sees which projects are valuable and does not spend time or incur costs scheduling them. The online algorithm in contrast must execute the project to determine their outcomes. Obviously, the one-step anticipatory algorithms extract from the scenarios which projects are promising, but they still have some significant probability to fail. This explanation is confirmed by instance P4 in which projects have a low probability of failure and only fail early. On this instance, the global loss is small, which directly means that the global anticipatory gap is small. Note also that this difficulty is not only due to the fact that projects may fail: similar behavior occurs if some project takes an extremely long time. One may also wonder whether all online algorithms will exhibit so large a gap, but this is not the case. For instance, on instance C5, the optimal online policy (in the expected sense) consists of not scheduling any activity, since the expected value of all projects is negative. Yet the one-step anticipatory algorithm has an expected value of −6,197, showing that a significant portion of the gap is due to its behavior. Subsequent sections address how to enhance the one-step anticipatory to account for this gap.

7. Gap Reduction Through Waiting

Waiting has been proposed for online stochastic vehicle routing (e.g., [2]) and was shown to produce significant improvements in solution quality. Its main benefit is to give the online algorithm more opportunity to observe the uncertainty, thus helping in taking more informed decisions. It is easy to integrate waiting in the online S-RCPSP: It suffices to schedule a dummy activity with no cost, no reward, and duration 1.

Figure 6:
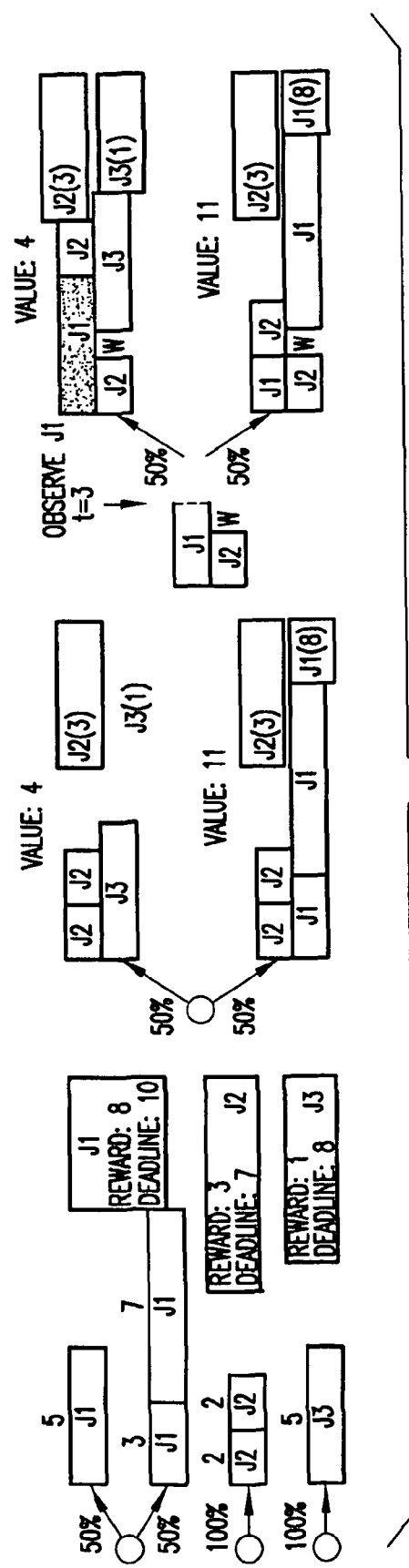
FIG. 6 shows an exemplary S-RCPSP instance, its clairvoyant solutions and optimal online policy with a wait in accordance with exemplary embodiments of the invention.

We can now show that waiting (e.g., $A_w$) may be the optimal decision in some instances of the online S-RCPSP. FIG. 6 shows a problem instance consisting of job 1 which succeeds and fails fifty percent of the time with respective durations of 5 and 10, as well as two other successful jobs. Job 2 has two activities of duration 2 and job 3 has one activity of duration 5. The deadlines are strict: either the job finishes before its deadline and receives its reward, or it has no reward. The activities have no cost. FIG. 6 shows the optimal solutions for both scenarios. Job 1 is not scheduled if it fails and the two other jobs yield their rewards for a total of 4. If job 1 succeeds, it yields its reward of 10 and there is enough room for job 2 which receives a reward of 3, giving a total reward of 11. Overall the expected value of the clairvoyant is thus $$\frac{4+11}{2} = 7.5.$$

FIG. 6 depicts the best online policy which achieves an optimal expected value of 7.5 (the GAG is zero in this case). The policy consists in scheduling jobs 1 and 2 and then waiting one time unit to observe the status of job 1. If the first activity of job 1 is not finished at time 3, it will fail. The best decision then consists in scheduling job 3 then job 2. If the first activity of job 1 is completed at time 3, then the best decision is to schedule its second activity and job 2. By waiting one time unit, the online agent is able to observe the status of job 1 and to select the best schedule. Note that if the agent waits until job 1 finishes to take the next decision and that job fails, it does not have time to schedule job 3 and therefore is sub-optimal. Similarly, if the agent does not wait, it will have to choose between scheduling jobs 2 and 3, which is suboptimal.

8. Gap Reduction Through Gap Correction

The one-step anticipatory algorithm uses the offline solution $O(s,d,\xi)$ as a prediction of the optimal policy $A^*(s,d,\xi)$ to evaluate each decision d in state s as shown in line 7 of the algorithm of FIG. 3. Obviously, replacing O by $A^*$ would produce an optimal decision. The basic idea in this section is to correct the evaluation $O^+(s,d,\xi)$ by estimating the anticipatory gap in a state s:$gap(s,\xi)=O^+(s,\xi)-A^{*+}(s,\xi)$ which denotes the loss of the optimal online policy $A^*$ compared to the clairvoyant on state s and scenario $\xi$. Note that the expected value of perfect information (EVPI), a fundamental concept in stochastic programming, is simply $EVPI(s)=E_\xi[gap(s,\xi)]$. Evaluating $gap(s,\xi)$ is difficult however. On the one hand, $A^*$ is not known: it is the optimal policy that one is trying to approximate. On the other hand, there are a gigantic number of states and scenarios in this problem. The exemplary approach herein involves evaluating the anticipatory gap on a training set and computing the best parameters of a model $\overline{gap}(s,\xi)$ approximating $gap(s,\xi)$. This is very natural, since stochastic optimization problems have a stochastic model of the uncertainty as part of their input.

Approximating the Gap using the First Decision The first difficulty in learning the anticipatory gap can be addressed by learning the expected global loss, i.e., $EGL=E_\xi[O(\xi)-A(\xi)]$, which provides an upper bound to the EVPI instead of the gap. The second difficulty is addressed by using a set $\Xi$ of training scenarios and measuring $$\overline{EGL} = \frac{1}{\#\Xi}\sum_{\xi\in\Xi}O(\xi)-A(\xi)$$

Then the anticipatory gap at state s for scenario $\xi$ can be approximated by $$\overline{gap}(s,\xi)=\overline{EGL}\times(1-CR(s,\xi))$$

where $$CR(s,\xi) = \frac{\#C+\#R}{\#\xi}$$

denotes the completion ratio of s in scenario $\xi$. The anticipatory algorithm with gap correction $A_{GC}$ is algorithm A in which line 7 becomes:

score[d]←score[d]+$O^+(s,d,\xi)$−
$\overline{gap}$(applyDecision(s,d),$\xi$).

More Complex Gap Learning models Several finer models have also been considered for gap learning. These models learn the gap in terms of the completion factors, the offline value of the scenario, and the set of successful jobs, as non-limiting examples. The results were a disappointment as they produce no significant improvement over algorithm $A_{GC}$.

9. Gap Reduction Through Time Scaling

Although gap correction significantly improves the solution quality of the one-step anticipatory algorithm, if fails to address some of the consequences of the endogenous nature of observations. Indeed, a comparison between offline and online solutions reveals that the clairvoyant is often able to schedule an additional project. This is possible because the clairvoyant does not lose time scheduling failing projects. The online algorithm however needs to schedule them to determine whether they will be successful.

Gap correction is successful in detecting when not to schedule projects whose expected value is negative but is not particularly effective in differentiating potential scheduling decisions. This is due to the fact that the learning phase of gap correction uses algorithm A which has a low local anticipatory gap early in the search as depicted in FIGS. 5A and 5B. This means that, whatever decision is taken at an early step, the clairvoyant has enough time subsequently to reach a high-quality solution since it does not lose time scheduling unsuccessful projects.

Time scaling is another generic technique to reduce the anticipatory gap: it recognizes that algorithm A necessarily loses time scheduling activities of unsuccessful projects and compensates by scaling the durations in the offline problems.

Systematic Time Scaling The simplest time scaling increases the duration globally by a common factor $f^{-1}$ (we use $f<1$), which, conceptually speaking, amounts to replacing the reward $f_j$ for project j by $$f_j^-(t) = f_j\left(\frac{t}{f}\right).$$

A more dynamic approach consists in scaling the remaining time only, i.e., after the decision time $t_d$ of the current state s=$\langle t_d,C,R\rangle$, i.e., $$f_j*(t) = \begin{cases} f_j(t) & \text{if } t<t_d \\ f_j\left(t_d+\frac{t-t_d}{f}\right) & \text{otherwise.} \end{cases}$$

Time Scaling by Job Effectiveness The above proposal scales durations uniformly. It seems more appropriate however to apply scalings tailored to each of the jobs. To obtain such a differentiated scaling, one may use job effectiveness, as a non-limiting example. That is, one may use the time spent on successful realizations of a job over the total time spent on the job. This measure can be learned offline like in gap correction and it gives ratios by which the durations should be scaled. Experimental results showed that this ratio was very low and led to drastic deadlines. Averaging the resulting with 1.0 (or equivalently dividing its distance to 1 by 2) led to much better results.

10. Gap Reduction by Problem Reduction

When studying the results of an online algorithm on a training set, another statistic can be gathered to boost the quality of the algorithm: the job performance. The performance of job j in a schedule $\sigma$ for scenario $\xi$ is simply $f_j(ct(j,\sigma))-\Sigma_{a_{i,j,\xi}\in O}c_{i,j,\xi}$ if j is successfully scheduled in $\sigma$ and $-\Sigma_{a_{i,j,\xi}\in O}c_{i,j,\xi}$ otherwise. Obviously, removing a job from consideration in the offline problem will decrease the quality of the offline schedule and reduce the anticipatory gap. Moreover, if a job contributes a negative amount in expectation, or a small amount compared to the total reward, the gap reduction will not come at a high cost, since removing the job will not degrade the overall quality of the online algorithm. This is one strategy experimented with in order to reduce the anticipatory gap: jobs yielding low performance (under a specific threshold like 1% or 5%) are discarded from the whole online policy.

11. Experimental Results

FIG. 7 gives a summary of the experimental results.

The Instances The experimental results are based on the reference instance proposed in [3] and a number of derived instances to explore the stochasticity and combinatorial landscape on the online S-RCPSP. The derived instances are obtained by scaling multiple parameters of the instance: the activity costs or durations, the deadlines, and the job rewards. The structure of the instances was also changed by removing activity failures by levels: this is the case of instances P1-P4 which have increasingly fewer failures and whose failures occur earlier. One instance (P1) has no failures in the last activity, while other instances (P2-P4) have no failures in the last two, three, or four levels (the latter has no failures at all since the longest jobs have four activities). Finally instance Agr averages the realizations to obtain only two realizations: one success and one failure. This reduces the number of realizations while roughly preserving the length, cost, and success distributions.

The Algorithms The experimental results compare a variety of algorithms on the online S-RCPSP. They include the anytime Heuristically-Confined Dynamic Programming algorithm with 10,000 simulations per heuristic, the one-step anticipatory algorithm without (A) and with ($A_w$) waiting, the anticipatory algorithm with gap correction ($A_{GC}$), the anticipatory algorithms with the three time-scaling approaches ($A_{TS}$, $A_{TT}$, $A_{TE}$), and the hybrid algorithm combining time scaling by job effectiveness and job pruning ($A_{TEJP}$). The systematic common scaling factor is 0.8 for $A_{TS}$. All anticipatory algorithms have been run with 200 scenarios per decision and all learning has been performed on an independent set of scenarios. The results are the average over 1,000 scenarios. The optimization solver used for the anticipatory algorithm is a dedicated branch and bound algorithm whose upper bound relaxes the resource constraints for the remaining tasks. Elastic relaxations were also tried but provided no additional computational benefits. This branch and bound is very fast and it takes on average less than 1 ms for the reference instance.

Gap Reduction Through Waiting The results about the waiting algorithm $A_w$ are somewhat mixed since, in average, $A_w$ produces solutions of slightly lower quality than A. $A_w$ improves instance C5 significantly, although the global loss on this instance is still significant. It also produces the best solutions on P3 and P4 which are the least stochastic problems. Why is waiting disappointing on the online S-RCPSP? The reason is once again the endogenous nature of observations. When waiting, algorithm $A_w$ also observes the realization of any activity that algorithm A would have scheduled and only loses a single time unit for that observation. As a result, in the context of endogenous observations, waiting actually increases the anticipatory gap; the algorithm also has a strong tendency to wait, since the gap is larger for this decision. The wait decision gets favored for many scenarios.

Gap Reduction Through Gap Correction Algorithm $A_{GC}$ returns better expected values than HCDP on all instances except D.6 and provides a 13% revenue improvement in average, which is quite significant. Gap correction is also very robust as it improves the solution quality of almost all instances. An examination of the traces of algorithm $A_{GC}$ reveals its main benefits: It terminates schedules early because the overall expected value of the projects is now negative thanks to the gap correction. It is highlighted on instances C2 and C5: In fact, $A_{GC}$ now returns the optimal policy on C5. However, as mentioned earlier, gap correction is not effective in differentiating the decisions. This is highlighted on instance D.6 for which its solution quality decreases.

Gap Reduction Through Time Scaling The static time-scaling algorithm $A_{TT}$ whose factors are computed for each instance from the expected loss of algorithm A on the training scenarios is also an effective gap-reduction technique. It returns better expected values than HCDP on all instances except D1.5 (an instance where the deadlines are much looser) and provides a 12% revenue improvement in average, which is quite significant. In contrast to $A_{GC}$, algorithms $A_{TT}$ and $A_{TS}$ are able to improve the solution quality of instance D.6 by removing sub-optimal jobs from consideration. Using job effectiveness is almost similarly effective and it is likely that, with a second learning phase, it would further improve. Scaling durations uniformly on all instances is not sufficient for improving solution quality as highlighted by the overall performance of $A_{TS}$.

Combining Gap Reduction Techniques The best algorithm in this experimental study is $A_{TEpR}$, which combines time scaling by job effectiveness and problem reduction. It returns better expected values than HCDP on all instances except D.6 and provides an expected revenue improvement close to 15% over HCDP and of more than 6% over the one-step anticipatory algorithm.

The Benefits of Gap-Reduction Techniques The results on the instances P1-P4 confirm the obvious intuition: the bigger the gap, the more effective the gap reduction techniques. In particular, on instances P3 and P4, which are the least stochastic, gap reduction techniques cause a slight decrease in expected value. Only a fine tightening of the deadlines on P4 and a complex learning model for gap correction (i.e., learn a linear regression of $A^+(s,d,\xi)$ with respect to $O^+(s,d,\xi)$ at each depth of decision) managed to improve algorithm A slightly on this instance. More generally, gap correction, dynamic time scaling, and the hybridization of time scaling and job pruning are robust across all instances and provide significant benefits. None of them however uniformly dominates the others on all instances.

Figure 8:
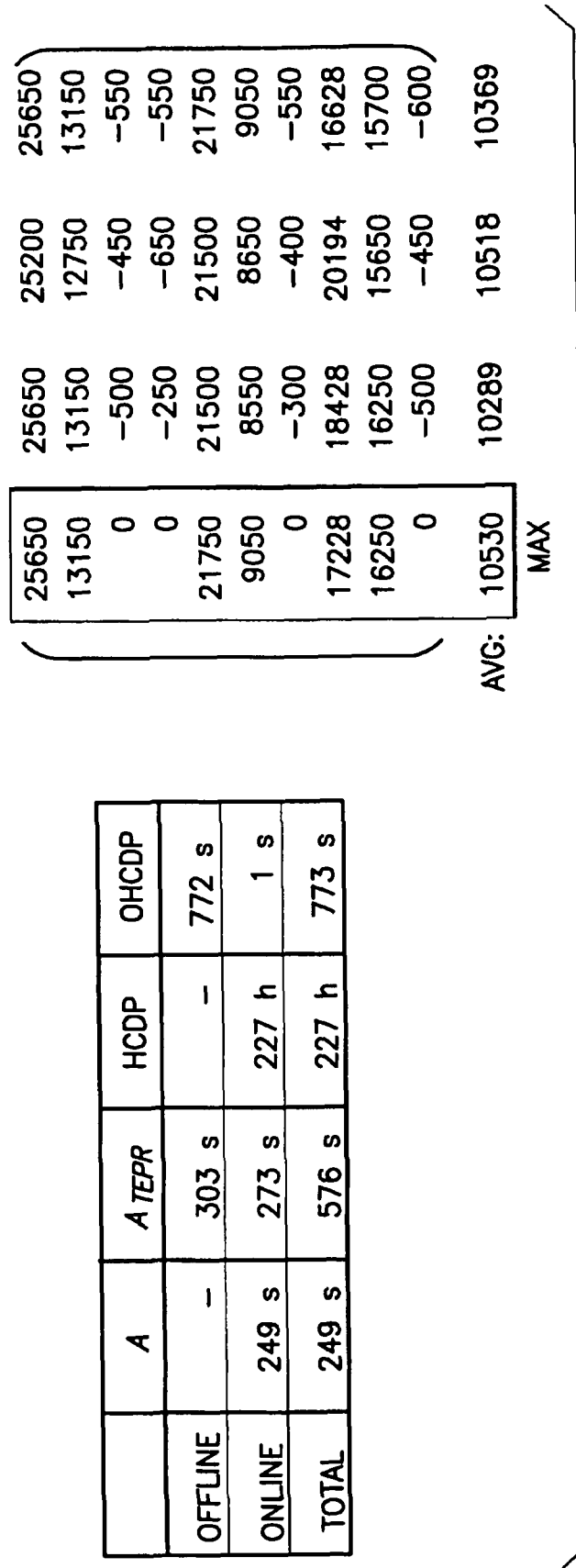
FIG. 8 illustrates a comparison of run times for solving 1000 scenarios and a decision matrix highlighting the anticipativity benefits of the waiting decision (first column) in accordance with exemplary embodiments of the invention.

Running-time Comparison An additional advantage of these gap-reduction techniques is that they do not increase the time of decision-making. Some require offline learning which took 1000 runs of algorithm A. FIG. 8 compares two anticipatory algorithms with HCDP in its online and the original version (OHCDP) whose quality is significantly worse. The results give the time taken to solve 1000 instances of instance Reg. Algorithm OHCDP learns with 450,000 trajectories and the $A_{TEPR}$ learns with 1,000 scenarios. These results show that algorithms A and $A_{TEPR}$ outperform the HCDP class of algorithms both in expected value and performance.

Comparison with AMSAA A companion paper presented another approach to reduce the anticipatory gap: the multi-step anticipatory algorithm, AMSAA [5]. AMSAA is guaranteed to converge to the optimal policy, although the convergence result is mostly of theoretical interest. FIG. 9 reports the relative gap in percentage between AMSAA and $A_{TEPR}$. $A_{TEPR}$ is compared with AMSAA-31MS, in which decisions are given 31 ms, for a total time of 611 s for 1,000 scenarios and AMSAA-32S which takes 91 h to solve those instances.

FIG. 9 shows that $A_{TEPR}$ is very competitive with AMSAA: it performs 14% better than AMSAA-31MS in average and is within 1% of the score of AMSAA-32S, which has a cpu time of a factor 1000 greater. On some instances, such as Cost2 and R.6, $A_{TEPR}$ even significantly outperforms AMSAA-32S. Note that on some instances, such as D.6, $A_{TEPR}$ has a larger gap than AMSAA, but $A_{TS}$ performs 15% better than AMSAA-32S on that instance.

12. Conclusion

This discussion considered the performance of one-step anticipatory algorithms on the online SRCPSP. This application is particularly challenging because of the endogenous nature of the observations that produces a significant anticipatory gap. Despite this difficulty, it was showed that one-step anticipatory algorithms significantly outperform the state-of-art HCDP algorithm. The paper also studied a number of gap-reduction techniques, including waiting, gap correction, time scaling, problem reduction, and their hybridizations. It showed that waiting produces mixed results, typically increasing the anticipatory gap, and often postponing decision too eagerly. The remaining gap-reduction techniques produce significant improvements in solution quality over HCDP, the best algorithm reaching about 15% in average. Gap-reduction techniques are particularly appropriate in settings in which decisions must be taken under severe time constraints as the gap-reduction techniques do not introduce significant overhead during execution.

13. Additional Exemplary Embodiments

Provided below are various descriptions of additional exemplary embodiments. The exemplary embodiments of the invention described below are intended solely as non-limiting examples and should not be construed as otherwise constraining the disclosure in any way, shape or form.

Figure 10:
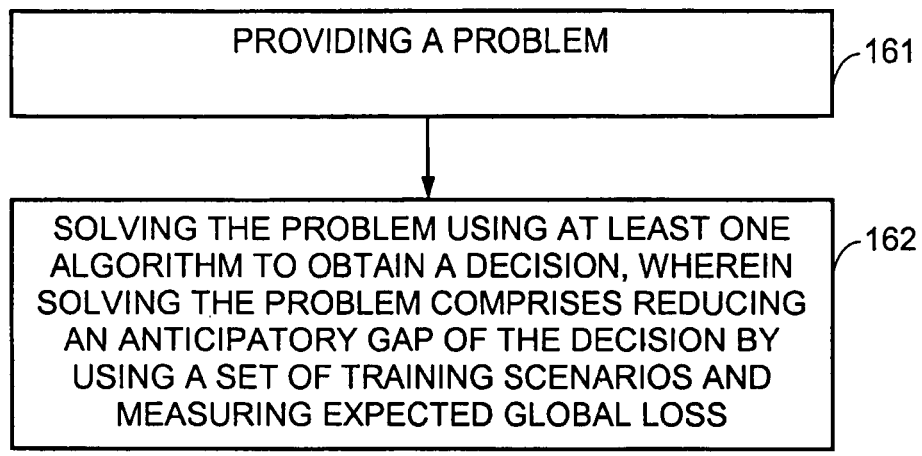
FIG. 10 depicts a flowchart illustrating one non-limiting example of a method for practicing the exemplary embodiments of this invention.

In one exemplary embodiment, and as shown in FIG. 10, a method comprising: providing a problem (161); and solving the problem using at least one algorithm to obtain a decision, wherein solving the problem comprises reducing an anticipatory gap of the decision by using a set of training scenarios and measuring expected global loss (162).

Figure 11:
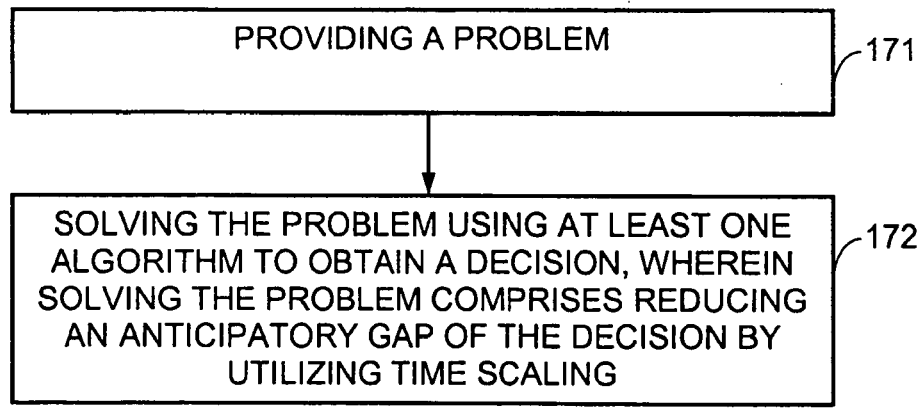
FIG. 11 depicts a flowchart illustrating another non-limiting example of a method for practicing the exemplary embodiments of this invention.

A method as in any above, wherein using the set of training scenarios and measuring the expected global loss are performed in order to correct an evaluation by estimating an anticipatory gap in a state which denotes a loss of an optimal online policy as compared to a clairvoyant on the state. A method as in any above, reducing the anticipatory gap further comprises computing best parameters of a model that approximates the anticipatory gap. A method as in any above, wherein the expected global loss provides an upper bound to an expected value of perfect information. A method as in any above, wherein reducing the anticipatory gap further comprises utilizing time scaling. A method as in any above, wherein reducing the anticipatory gap further comprises using problem reduction based on job performance In another exemplary embodiment, and as shown in FIG. 11, a method comprising: providing a problem (171); and solving the problem using at least one algorithm to obtain a decision, wherein solving the problem comprises reducing an anticipatory gap of the decision by utilizing time scaling (172). A method as in the previous, wherein utilizing time scaling comprises at least one of increasing time duration globally by a common factor, scaling remaining time after a decision time of a current state or scaling time differently for each job. A method as in the previous, wherein reducing the anticipatory gap further comprises using problem reduction based on job performance.

Figure 12:
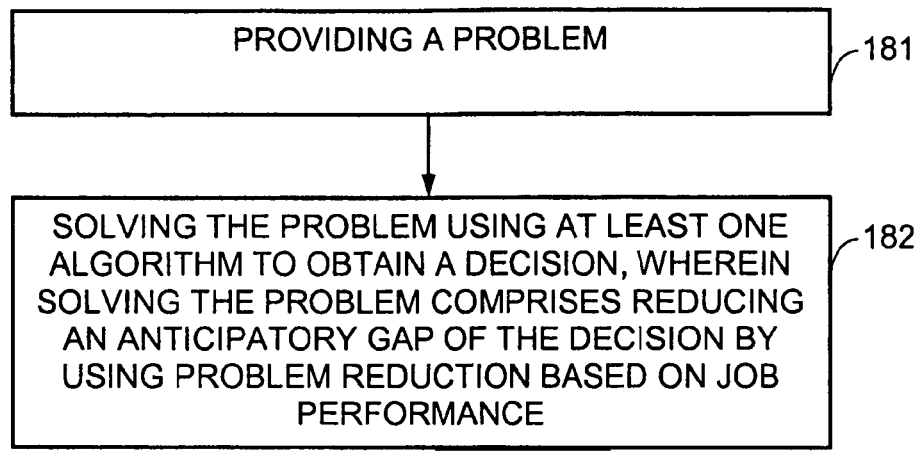
FIG. 12 depicts a flowchart illustrating another non-limiting example of a method for practicing the exemplary embodiments of this invention.

In another exemplary embodiment, and as shown in FIG. 12, a method comprising: providing a problem (181); and solving the problem using at least one algorithm to obtain a decision, wherein solving the problem comprises reducing an anticipatory gap of the decision by using problem reduction based on job performance (182).

A method as in any above, wherein the at least one algorithm comprises a one-step anticipatory algorithm. A method as in the previous, wherein the one-step anticipatory algorithm uses an offline solution as a prediction of an optimal policy to evaluate each decision in a state. A method as in any above, wherein the problem comprises an online stochastic combinatorial optimization problem or a stochastic resource-constrained project scheduling problem. A method as in any above, wherein the method is implemented as a computer program. A method as in any above, wherein the method is implemented as a computer program stored in a computer-readable medium and executable by a processor.

Figure 15:
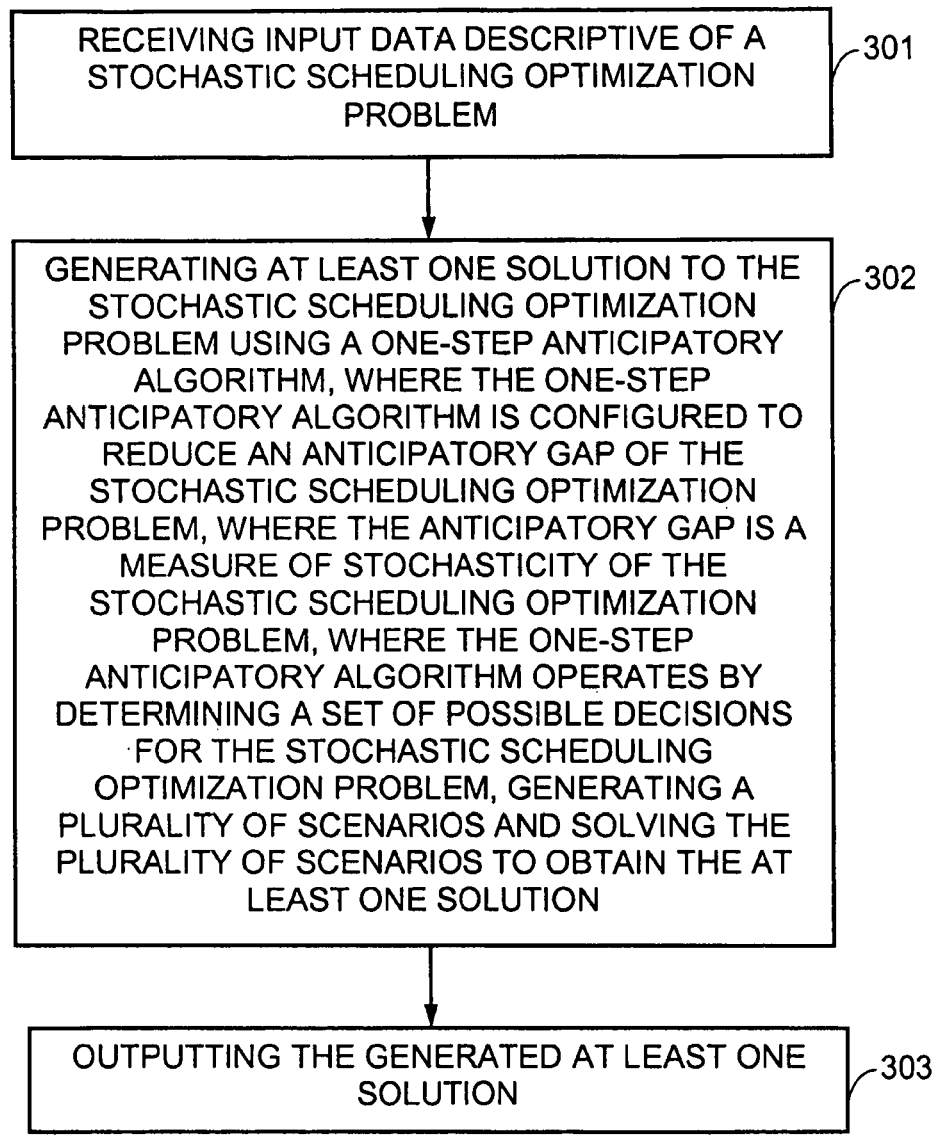
FIG. 15 depicts a flowchart illustrating another non-limiting example of a method for practicing the exemplary embodiments of this invention.

In another exemplary embodiment, and as shown in FIG. 15, a method comprising: receiving (e.g., by an input, by an input of a processor) input data descriptive of a stochastic scheduling optimization problem (301); generating (e.g., by a processor) at least one solution to the stochastic scheduling optimization problem using a one-step anticipatory algorithm, where the one-step anticipatory algorithm is configured to reduce an anticipatory gap of the stochastic scheduling optimization problem, where the anticipatory gap is a measure of stochasticity of the stochastic scheduling optimization problem, where the one-step anticipatory algorithm operates by determining a set of possible decisions for the stochastic scheduling optimization problem, generating a plurality of scenarios and solving the plurality of scenarios to obtain the at least one solution (302); and outputting (e.g., by an output, by an output of the processor) the generated at least one solution (303).

Note that the above methods may be combined (e.g., practiced together) in any feasible manner.

In another exemplary embodiment, a computer program product comprising program instructions embodied on a tangible computer-readable medium, execution of the program instructions resulting in operations comprising the steps of any one of the above-described methods.

In another exemplary embodiment, a computer-readable medium (e.g., a memory), tangibly embodying a computer program executable by a processor for performing operations, said operations comprising the steps of any one of the above-described methods.

In another exemplary embodiment, an apparatus comprising: a memory configured to store information corresponding to (e.g., indicative of) a problem; and a processor configured to solve the problem using at least one algorithm to obtain a decision, wherein solving the problem comprises reducing an anticipatory gap of the decision by using a set of training scenarios and measuring expected global loss.

In another exemplary embodiment, an apparatus comprising: a memory configured to store information corresponding to (e.g., indicative of) a problem; and a processor configured to solve the problem using at least one algorithm to obtain a decision, wherein solving the problem comprises reducing an anticipatory gap of the decision by utilizing time scaling.

In another exemplary embodiment, an apparatus comprising: a memory configured to store information corresponding to (e.g., indicative of) a problem; and a processor configured to solve the problem using at least one algorithm to obtain a decision, wherein solving the problem comprises reducing an anticipatory gap of the decision by using problem reduction based on job performance.

Note that the apparatus above may be combined (e.g., practiced together) in any feasible manner.

In another exemplary embodiment, an apparatus comprising: means for storing information corresponding to (e.g., indicative of) a problem; and means for solving the problem using at least one algorithm to obtain a decision, wherein solving the problem comprises reducing an anticipatory gap of the decision by using a set of training scenarios and measuring expected global loss.

In another exemplary embodiment, an apparatus comprising: means for storing information corresponding to (e.g., indicative of) a problem; and means for solving the problem using at least one algorithm to obtain a decision, wherein solving the problem comprises reducing an anticipatory gap of the decision by utilizing time scaling.

In another exemplary embodiment, an apparatus comprising: means for storing information corresponding to (e.g., indicative of) a problem; and means for solving the problem using at least one algorithm to obtain a decision, wherein solving the problem comprises reducing an anticipatory gap of the decision by using problem reduction based on job performance.

Note that the apparatus above may be combined (e.g., practiced together) in any feasible manner.

In another exemplary embodiment of the invention, an apparatus comprising: a memory configured to store input data descriptive of a stochastic scheduling optimization problem; and a processor configured to receive the input data from the memory, to generate at least one solution to the stochastic scheduling optimization problem using a one-step anticipatory algorithm, and to output the generated at least one solution, where the one-step anticipatory algorithm is configured to reduce an anticipatory gap of the stochastic scheduling optimization problem, where the anticipatory gap is a measure of stochasticity of the stochastic scheduling optimization problem, where the one-step anticipatory algorithm operates by determining a set of possible decisions for the stochastic scheduling optimization problem, generating a plurality of scenarios and solving the plurality of scenarios to obtain the at least one solution.

In another exemplary embodiment of the invention, a program storage device readable by a machine, tangibly embodying a program of instructions executable by the machine for performing operations, said operations comprising: receiving input data descriptive of a stochastic scheduling optimization problem; generating at least one solution to the stochastic scheduling optimization problem using a one-step anticipatory algorithm, where the one-step anticipatory algorithm is configured to reduce an anticipatory gap of the stochastic scheduling optimization problem, where the anticipatory gap is a measure of stochasticity of the stochastic scheduling optimization problem, where the one-step anticipatory algorithm operates by determining a set of possible decisions for the stochastic scheduling optimization problem, generating a plurality of scenarios and solving the plurality of scenarios to obtain the at least one solution; and outputting the generated at least one solution.

In another exemplary embodiment, an apparatus comprising: means for receiving (e.g., an input, an input of a processor) input data descriptive of a stochastic scheduling optimization problem; means for generating (e.g., a processor) at least one solution to the stochastic scheduling optimization problem using a one-step anticipatory algorithm, where the one-step anticipatory algorithm is configured to reduce an anticipatory gap of the stochastic scheduling optimization problem, where the anticipatory gap is a measure of stochasticity of the stochastic scheduling optimization problem, where the one-step anticipatory algorithm operates by determining a set of possible decisions for the stochastic scheduling optimization problem, generating a plurality of scenarios and solving the plurality of scenarios to obtain the at least one solution; and means for outputting (e.g., an output, an output of the processor) the generated at least one solution.

Figure 13:
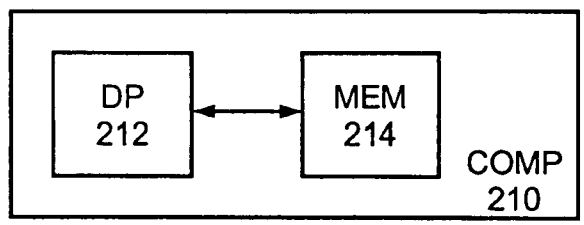
FIG. 13 illustrates an exemplary apparatus, such as a computer, with which the exemplary embodiments of the invention may be practiced.

FIG. 13 illustrates an exemplary apparatus, such as a computer (COMP) 210, with which the exemplary embodiments of the invention may be practiced. The apparatus 210 comprises at least one data processor (DP) 212 and at least one memory (MEM) 214. As non-limiting examples, the COMP 210 may comprise a desktop computer or a portable computer. In further exemplary embodiments, the COMP 210 may further comprise one or more user interface (UI) elements, such as a display, a keyboard, a mouse or any other such UI components, as non-limiting examples.

The exemplary embodiments of this invention may be carried out by computer software implemented by the DP 212 or by hardware, or by a combination of hardware and software. As a non-limiting example, the exemplary embodiments of this invention may be implemented by one or more integrated circuits. The MEM 214 may be of any type appropriate to the technical environment and may be implemented using any appropriate data storage technology, such as optical memory devices, magnetic memory devices, semiconductor-based memory devices, fixed memory and removable memory, as non-limiting examples. The DP 212 may be of any type appropriate to the technical environment, and may encompass one or more of microprocessors, general purpose computers, special purpose computers and processors based on a multi-core architecture, as non-limiting examples.

Figure 14:
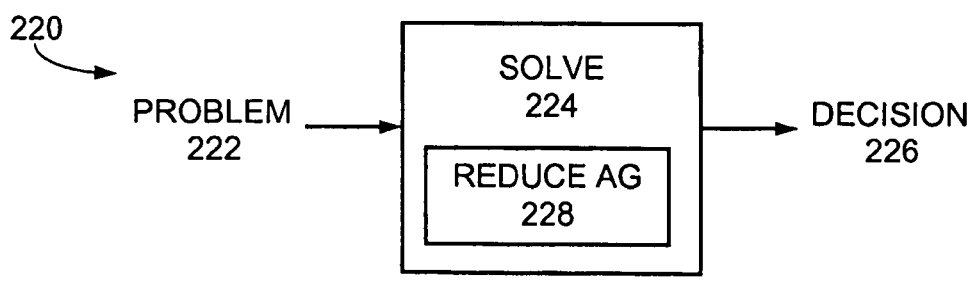
FIG. 14 depicts a representation of exemplary operations and/or components with which the exemplary embodiments of the invention may be practiced.

FIG. 14 depicts a representation 220 of exemplary operations and/or components with which the exemplary embodiments of the invention may be practiced. The below-described exemplary operations may be utilized in conjunction with hardware (e.g., as described above with respect to FIG. 11), software (e.g., a computer program, such as the ones described above) or a combination of hardware and software. A problem 222 (e.g., an online stochastic combinatorial optimization problem or a stochastic resource-constrained project scheduling problem) is solved (SOLVE) 224 (e.g., using a one-step anticipatory algorithm) to obtain a decision 226 (e.g., for a state). In conjunction with the solving, an anticipatory gap (AG) of the obtained decision is reduced (REDUCE AG) 228.

The exemplary blocks 224, 228 shown in FIG. 10 may comprise operations, processes, one or more processing blocks, one or more functional components and/or functions performed by one or more components or blocks, as non-limiting examples. The exemplary blocks 224, 228 may comprise or correspond to hardware, software or a combination of hardware and software, as non-limiting examples.

It should be noted that the above-described exemplary embodiments of the invention may further comprise one or more additional aspects, as suitable, as further described elsewhere herein.

The exemplary embodiments of the invention, as discussed herein and as particularly described with respect to exemplary methods, may be implemented in conjunction with a program storage device (e.g., at least one memory) readable by a machine, tangibly embodying a program of instructions (e.g., a program or computer program) executable by the machine for performing operations. The operations comprise steps of utilizing the exemplary embodiments or steps of the method.

The blocks shown in FIGS. 10-12 further may be considered to correspond to one or more functions and/or operations that are performed by one or more components, circuits, chips, apparatus, processors, computer programs and/or function blocks. Any and/or all of the above may be implemented in any practicable solution or arrangement that enables operation in accordance with the exemplary embodiments of the invention as described herein.

In addition, the arrangement of the blocks depicted in FIGS. 10-12 should be considered merely exemplary and non-limiting. It should be appreciated that the blocks shown in FIGS. 10-12 may correspond to one or more functions and/or operations that may be performed in any order (e.g., any suitable, practicable and/or feasible order) and/or concurrently (e.g., as suitable, practicable and/or feasible) so as to implement one or more of the exemplary embodiments of the invention. In addition, one or more additional functions, operations and/or steps may be utilized in conjunction with those shown in FIGS. 10-12 so as to implement one or more further exemplary embodiments of the invention.

That is, the exemplary embodiments of the invention shown in FIGS. 10-12 may be utilized, implemented or practiced in conjunction with one or more further aspects in any combination (e.g., any combination that is suitable, practicable and/or feasible) and are not limited only to the steps, blocks, operations and/or functions shown in FIGS. 10-12.

Still further, the various names used for the different parameters, variables, components and/or items are not intended to be limiting in any respect, as these parameters, variables, components and/or items may be identified by any suitable names.

Any use of the terms "connected," "coupled" or variants thereof should be interpreted to indicate any such connection or coupling, direct or indirect, between the identified elements. As a non-limiting example, one or more intermediate elements may be present between the "coupled" elements. The connection or coupling between the identified elements may be, as non-limiting examples, physical, electrical, magnetic, logical or any suitable combination thereof in accordance with the described exemplary embodiments. As non-limiting examples, the connection or coupling may comprise one or more printed electrical connections, wires, cables, mediums or any suitable combination thereof.

Generally, various exemplary embodiments of the invention can be implemented in different mediums, such as software, hardware, logic, special purpose circuits or any combination thereof. As a non-limiting example, some aspects may be implemented in software which may be run on a computing device, while other aspects may be implemented in hardware.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications will still fall within the scope of the teachings of the exemplary embodiments of the invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
   receiving, by an input, input data descriptive of a stochastic scheduling optimization problem;
   generating, by a processor, at least one solution to the stochastic scheduling optimization problem using a one-step anticipatory algorithm, where the one-step anticipatory algorithm is configured to reduce an anticipatory gap of the stochastic scheduling optimization problem, where the anticipatory gap is a measure of stochasticity of the stochastic scheduling optimization problem, where the one-step anticipatory algorithm operates by determining a set of possible decisions for the stochastic scheduling optimization problem, generating a plurality of scenarios and solving the plurality of scenarios to obtain the at least one solution; and
   outputting, by an output, the generated at least one solution.

2. The method as in claim 1, where the one-step anticipatory algorithm is configured to reduce the anticipatory gap by inserting at least one delay period.

3. The method as in claim 2, where the one-step anticipatory algorithm inserts the at least one delay period by scheduling at least one dummy activity having no cost, no reward and a duration of one time period.

4. The method as in claim 1, where the one-step anticipatory algorithm is configured to reduce the anticipatory gap by evaluating the anticipatory gap on a training set and computing parameters for a model approximating the anticipatory gap.

5. The method as in claim 1, where the one-step anticipatory algorithm is configured to reduce the anticipatory gap by utilizing time scaling.

6. The method as in claim 1, where the one-step anticipatory algorithm is configured to reduce the anticipatory gap by increasing duration globally by a common factor.

7. The method as in claim 1, where the one-step anticipatory algorithm is configured to reduce the anticipatory gap by scaling only remaining time after a certain decision time of a current state.

8. The method as in claim 1, where the one-step anticipatory algorithm is configured to reduce the anticipatory gap by applying at least two different time scalings to at least two different activities of the stochastic scheduling optimization problem.

9. The method as in claim 1, where the one-step anticipatory algorithm is configured to reduce the anticipatory gap by removing from consideration at least one activity of the stochastic scheduling optimization problem based on expected activity performance.

10. The method as in claim 1, where the one-step anticipatory algorithm is configured to reduce the anticipatory gap by applying at least two different time scalings to at least two different activities of the stochastic scheduling optimization problem based on time spent on successful realizations of the individual activities over a total time spent on the individual activities and by removing from consideration at least one activity of the stochastic scheduling optimization problem based on expected activity performance.

11. The method as in claim 1, where the method is implemented by a computer program stored on a computer-readable medium.

12. An apparatus comprising:
   a memory configured to store input data descriptive of a stochastic scheduling optimization problem; and a processor configured to receive the input data from the memory, to generate at least one solution to the stochastic scheduling optimization problem using a one-step anticipatory algorithm, and to output the generated at least one solution, where the one-step anticipatory algorithm is configured to reduce an anticipatory gap of the stochastic scheduling optimization problem, where the anticipatory gap is a measure of stochasticity of the stochastic scheduling optimization problem, where the one-step anticipatory algorithm operates by determining a set of possible decisions for the stochastic scheduling optimization problem, generating a plurality of scenarios and solving the plurality of scenarios to obtain the at least one solution.

13. The apparatus as in claim 12, where the one-step anticipatory algorithm is configured to reduce the anticipatory gap by performing at least one of: inserting at least one delay period, evaluating the anticipatory gap on a training set and computing parameters for a model approximating the anticipatory gap, utilizing time scaling and removing from consideration at least one activity of the stochastic scheduling optimization problem based on expected activity performance.

14. The apparatus as in claim 12, where the one-step anticipatory algorithm is configured to reduce the anticipatory gap by applying at least two different time scalings to at least two different activities of the stochastic scheduling optimization problem based on time spent on successful realizations of the individual activities over a total time spent on the individual activities and by removing from consideration at least one activity of the stochastic scheduling optimization problem based on expected activity performance.

15. A non-transitory program storage device readable by a machine, tangibly embodying a program of instructions executable by the machine for performing operations, said operations comprising:

receiving input data descriptive of a stochastic scheduling optimization problem;

generating at least one solution to the stochastic scheduling optimization problem using a one-step anticipatory algorithm, where the one-step anticipatory algorithm is configured to reduce an anticipatory gap of the stochastic scheduling optimization problem, where the anticipatory gap is a measure of stochasticity of the stochastic scheduling optimization problem, where the one-step anticipatory algorithm operates by determining a set of possible decisions for the stochastic scheduling optimization problem, generating a plurality of scenarios and solving the plurality of scenarios to obtain the at least one solution; and outputting the generated at least one solution.

16. The non-transitory program storage device as in claim 15, where the one-step anticipatory algorithm is configured to reduce the anticipatory gap by performing at least one of: inserting at least one delay period, evaluating the anticipatory gap on a training set and computing parameters for a model approximating the anticipatory gap, utilizing time scaling and removing from consideration at least one activity of the stochastic scheduling optimization problem based on expected activity performance.

17. The non-transitory program storage device as in claim 15, where the one-step anticipatory algorithm is configured to reduce the anticipatory gap by applying at least two different time scalings to at least two different activities of the stochastic scheduling optimization problem based on time spent on successful realizations of the individual activities over a total time spent on the individual activities and by removing from consideration at least one activity of the stochastic scheduling optimization problem based on expected activity performance.

* * * * *